US008581865B2

(12) United States Patent
Choo et al.

(10) Patent No.: US 8,581,865 B2
(45) Date of Patent: Nov. 12, 2013

(54) TOUCH PANEL, DISPLAY DEVICE WITH THE SAME, AND METHOD FOR MANUFACTURING THE DISPLAY DEVICE

(75) Inventors: Dae-Ho Choo, Seongnam-si (KR); Ho-Min Kang, Suwon-si (KR)

(73) Assignee: Samsung Display Co., Ltd. (KR)

( * ) Notice: Subject to any disclaimer, the term of this patent is extended or adjusted under 35 U.S.C. 154(b) by 211 days.

(21) Appl. No.: 13/011,737

(22) Filed: Jan. 21, 2011

(65) Prior Publication Data

US 2011/0107593 A1  May 12, 2011

Related U.S. Application Data

(62) Division of application No. 11/713,235, filed on Feb. 28, 2007, now abandoned.

(30) Foreign Application Priority Data

Feb. 28, 2006  (KR) .................. 10-2006-0019282

(51) Int. Cl.
*G06F 3/043*  (2006.01)
(52) U.S. Cl.
USPC ............. 345/173; 345/76; 345/102; 345/104; 29/835; 219/121.67; 219/121.72; 349/153; 349/190
(58) Field of Classification Search
USPC ............. 345/177, 173, 156, 204, 76, 87, 102; 349/12, 153, 156, 187–192; 361/280, 361/760, 763; 341/15, 33, 34; 428/410, 428/209; 178/18.01–18.04, 19.02; 29/825, 29/830, 832, 835; 219/121.67, 121.72, 219/121.73
See application file for complete search history.

(56) References Cited

U.S. PATENT DOCUMENTS

| 3,806,642 | A | 4/1974 | Veith et al. |
| 6,768,257 | B1 | 7/2004 | Yamada et al. |
| 6,876,144 | B2 | 4/2005 | Peng |
| 6,972,750 | B2 | 12/2005 | Yu |
| 7,307,686 | B2 * | 12/2007 | Jang .............................. 349/190 |
| 7,456,562 | B2 | 11/2008 | Yokoyama |
| 7,708,614 | B2 * | 5/2010 | Harada .......................... 445/25 |
| 8,013,973 | B2 * | 9/2011 | Kanai et al. .................. 349/190 |
| 2002/0033908 | A1 | 3/2002 | Mori et al. |
| 2003/0076473 | A1 * | 4/2003 | Sasaki ........................... 349/187 |

(Continued)

FOREIGN PATENT DOCUMENTS

| CN | 1510480 A | 7/2004 |
| CN | 1534333 A | 10/2004 |

(Continued)

OTHER PUBLICATIONS

Yu, et al., Efficient blue electroluminescent device using tetra(B-naphthyl)silane as a hole-blocking material, Applied Physics Letters 87, 222115 (2005), 3 pages.

*Primary Examiner* — Lun-Yi Lao
*Assistant Examiner* — Priyank Shah
(74) *Attorney, Agent, or Firm* — Innovation Counsel LLP (57) ABSTRACT

A display device is provided with a touch panel includes: a base substrate; a first transparent electrode layer located on the base substrate; an ultrasonic wave guiding layer located on the first transparent electrode layer; a second transparent electrode layer located on the ultrasonic wave guiding layer; an ultrasonic wave transmitting unit and an ultrasonic wave receiving unit located on the second transparent electrode layer; and a protecting layer located on the second transparent electrode layer.

17 Claims, 8 Drawing Sheets

(56) References Cited

U.S. PATENT DOCUMENTS

| | | | |
|---|---|---|---|
| 2004/0169809 A1* | 9/2004 | Yamabuchi et al. | 349/153 |
| 2004/0179165 A1 | 9/2004 | Kinoshita et al. | |
| 2004/0189587 A1* | 9/2004 | Jung et al. | 345/102 |
| 2004/0212749 A1* | 10/2004 | Yu et al. | 349/12 |
| 2004/0263483 A1 | 12/2004 | Aufderheide | |
| 2005/0040392 A1 | 2/2005 | Wu et al. | |
| 2005/0136289 A1 | 6/2005 | Chu et al. | |
| 2005/0186717 A1* | 8/2005 | Gyoda et al. | 438/149 |
| 2005/0242346 A1 | 11/2005 | Forrest et al. | |
| 2006/0066724 A1* | 3/2006 | Eguchi et al. | 348/188 |
| 2006/0279490 A1 | 12/2006 | Park et al. | |
| 2008/0158482 A1* | 7/2008 | Jang et al. | 349/73 |
| 2010/0102719 A1* | 4/2010 | Lee et al. | 313/512 |

FOREIGN PATENT DOCUMENTS

| | | |
|---|---|---|
| JP | 64-070814 A | 3/1989 |
| JP | 03-238519 A | 10/1991 |
| JP | 09-073360 A | 3/1997 |
| JP | 2000-173777 | 6/2000 |
| JP | 2002-090737 A | 3/2002 |
| JP | 2002-342016 A | 11/2002 |
| JP | 2004-046500 A | 2/2004 |
| JP | 2005-150080 | 6/2005 |
| JP | 2005-150082 | 6/2005 |
| JP | 2005-150084 | 6/2005 |
| KR | 1020010094773 A | 11/2001 |
| KR | 1020020028356 A | 4/2002 |
| KR | 1020030015611 A | 2/2003 |

* cited by examiner

TOUCH PANEL, DISPLAY DEVICE WITH THE SAME, AND METHOD FOR MANUFACTURING THE DISPLAY DEVICE

CROSS-REFERENCE TO RELATED APPLICATION

This is a divisional of U.S. patent application Ser. No. 11/713,235, filed Feb. 28, 2007, which application claims priority to and the benefit of Korean Patent Application No. 10-2006-0019282 filed in the Korean Intellectual Property Office on Feb. 28, 2006, the entire contents of which are incorporated herein by their references.

BACKGROUND OF THE INVENTION

1. Field of the Invention

The present invention relates to a touch panel for a display device and, more particularly, to a more easily manufactured touch panel.

2. Description of the Related Art

Since a liquid crystal display panel cannot emit light by itself, it is provided with a backlight assembly for emitting light. However, a conventional backlight assembly is separately manufactured from the general display panel and then assembled with the display panel to form a display device. A display device may be provided with a touch panel to enable the user to more easily indicate and obtain specific information. However, the conventional touch panel is separately manufactured and is attached to a display device making the whole process of manufacturing a display device with a touch panel attached complicated and reducing productivity.

SUMMARY OF THE INVENTION

According to one aspect of the present invention a more easily manufactured display having a touch panel includes: a base substrate; a first transparent electrode layer located on the base substrate; an ultrasonic wave guiding layer located on the first transparent electrode layer; a second transparent electrode layer located on the ultrasonic wave guiding layer; an ultrasonic wave transmitting unit and an ultrasonic wave receiving unit located on the second transparent electrode layer; and a protecting layer located on the second transparent electrode layer.

The ultrasonic wave transmitting unit may include X-axis transmitting units located along an edge of the base substrate, and Y-axis transmitting units located along another edge adjacent to the edge along which the X-axis transmitting units are located, and the ultrasonic wave receiving unit may include an X-axis receiving unit located along another edge opposite to the X-axis transmitting units, and a Y-axis receiving unit formed along another edge opposite to the Y-axis transmitting units.

The ultrasonic wave guiding layer may be made of a material including at least one of ZnO, Al-doped ZnO (AZO), and polyvinylidenefluoride (PVDF).

According to a second embodiment of the invention, a display device includes: a display panel that has a plurality of pixels and displays an image; and a touch panel located on the front surface of the display panel. In this embodiment, the touch panel includes a base substrate; a first transparent electrode layer located on the base substrate; an ultrasonic wave guiding layer located on the first transparent electrode layer; a second transparent electrode layer located on the ultrasonic wave guiding layer; an ultrasonic wave transmitting unit and an ultrasonic wave receiving unit located on the second transparent electrode layer; and a protecting layer located on the second transparent electrode layer.

In the display device, the ultrasonic wave transmitting unit may include X-axis transmitting units located along an edge of the base substrate, and Y-axis transmitting units located along another edge adjacent to the edge along which the X-axis transmitting units are located, and the ultrasonic wave receiving unit may include an X-axis receiving unit located along another edge opposite to the X-axis transmitting units, and a Y-axis receiving unit located along another edge opposite to the Y-axis transmitting units.

The ultrasonic wave guiding layer may be made of a material including at least one of ZnO, Al-doped ZnO (AZO), and polyvinylidenefluoride (PVDF).

The display panel may include a first display panel located on the rear side thereof, and a second display panel that is located on the front side thereof and is bonded to the first display panel, and the touch panel may be located on the front surface of the second display panel.

The display device may further include a backlight assembly located on the rear surface of the first display panel.

In this structure, the backlight assembly may include a light source substrate, a driving circuit unit located on the light source substrate, an anode connected to the driving circuit unit, an organic layer located on the anode, and a cathode located on the organic layer.

The base substrate, the first display panel, the second display panel, and the light source substrate may be formed of a ceramic material to have rigidity.

Alternatively, the base substrate, the first display panel, the second display panel, and the light source substrate may be formed of a plastic material to have flexibility.

The organic layer may be divided into a plurality of regions corresponding to the pixels of the display panel, respectively, and the driving circuit unit may drive the plurality of regions of the organic layer to individually emit light.

The divided regions of the organic layer may emit three primary color light components.

The display device may further include a first polarizer attached between the rear surface of the first display panel and the backlight assembly, and a second polarizer attached between the front surface of the second display panel and the touch panel.

The display device may further include an additional polarizer attached between the rear surface of the first display panel and the backlight assembly. In this display device, a polarizer may be used as the base substrate of the touch panel.

The second display panel and the base substrate of the touch panel may be integrated into a whole.

According to a third embodiment of the invention, a method of manufacturing a display device includes: providing a mother display panel; providing a mother touch panel of a front surface of the mother display panel; and providing a plurality of display panels each having a touch panel attached thereto by cutting the mother touch panel together with the mother display panel.

In the method of manufacturing a display device according to the third embodiment, the mother display panel may include a first mother display panel located on the rear side thereof and a second mother display panel that is located on the front side thereof and bonded to the first mother display panel. Further, a first polarizer may be attached to the rear surface of the first mother display panel and a second polarizer may be attached to the front surface of the second mother display panel. Furthermore, the mother touch panel may be located on the front surface of the second polarizer.

The touch panel may include a base substrate attached to the second polarizer, a first transparent electrode layer located on the base substrate, an ultrasonic wave guiding layer located on the first transparent electrode layer, a second transparent electrode layer located on the ultrasonic wave guiding layer, an ultrasonic wave transmitting unit and an ultrasonic wave receiving unit located on the second transparent electrode layer, and a protecting layer located on the second transparent electrode layer.

Alternatively, the touch panel may include a first transparent electrode layer located on the second polarizer, an ultrasonic wave guiding layer located on the first transparent electrode layer, a second transparent electrode layer located on the ultrasonic wave guiding layer, an ultrasonic wave transmitting unit and an ultrasonic wave receiving unit located on the second transparent electrode layer, and a protecting layer located on the second transparent electrode layer.

The second polarizer having the mother touch panel attached thereto may be attached to the rear surface of the second mother display panel.

The mother touch panel may be attached to the second polarizer attached to the rear surface of the second mother display panel.

The method of manufacturing a display device may further include providing a mother backlight assembly on the first polarizer, and providing a plurality of display panels each having a touch panel and a backlight assembly attached thereto by cutting the mother backlight assembly together with the mother display panel and the mother touch panel in a mother display panel cutting process.

The first polarizer having the mother backlight assembly attached thereto may be attached to the rear surface of the first mother display panel.

Further, the mother backlight assembly may be attached to the first polarizer attached to the rear surface of the first mother display panel.

Furthermore, the backlight assembly may include a light source substrate, a driving circuit unit located on the light source substrate, an anode connected to the driving circuit unit, an organic layer located on the anode, and a cathode located on the organic layer.

The method of manufacturing a display device may further include providing a backlight assembly on the rear surface of the display panel.

In the third embodiment, the mother display panel may be cut by any one of a water jet method, a wheel scriber method, and a laser cutting method.

According to a fourth embodiment of the invention, a method of manufacturing a display device includes: providing a mother display panel; providing a mother backlight assembly on the rear surface of the mother display panel; providing a plurality of display panels each having a backlight assembly attached thereto by cutting the mother backlight assembly together with the mother display panel; and providing a touch panel on the front surface of the display panel.

In the method of manufacturing a display device according to the fourth embodiment, the backlight assembly may include a light source substrate, a driving circuit unit located on the light source substrate, an anode connected to the driving circuit unit, an organic layer located on the anode, and a cathode located on the organic layer.

Also, the mother display panel may include a first mother display panel located on the rear side thereof and a second mother display panel that is located on the front side thereof and is bonded to the first mother display panel. Further, a first polarizer may be attached to the rear surface of the first mother display panel and a second polarizer may be attached to the front surface of the second mother display panel. Furthermore, the mother backlight assembly may be located on the rear surface of the first polarizer.

In this method, the first polarizer having the mother backlight assembly attached thereto may be attached to the rear surface of the first mother display panel.

The mother backlight assembly may be attached to the first polarizer attached to the rear surface of the first mother display panel.

In the method of manufacturing a display device according to the fourth embodiment, the touch panel may include a base substrate attached to the second polarizer, a first transparent electrode layer located on the base substrate, an ultrasonic wave guiding layer located on the first transparent electrode layer, a second transparent electrode layer located on the ultrasonic wave guiding layer, an ultrasonic wave transmitting unit and an ultrasonic wave receiving unit located on the second transparent electrode layer, and a protecting layer located on the second transparent electrode layer.

Alternatively, the touch panel may include a first transparent electrode layer located on the second polarizer, an ultrasonic wave guiding layer located on the first transparent electrode layer, a second transparent electrode layer located on the ultrasonic wave guiding layer, an ultrasonic wave transmitting unit and an ultrasonic wave receiving unit located on the second transparent electrode layer, and a protecting layer located on the second transparent electrode layer.

The mother display panel may be cut by any one of a water jet method, a wheel scriber method, and a laser cutting method.

DETAILED DESCRIPTION OF THE EMBODIMENTS

In the drawings, the thickness of layers, films, panels, regions, etc. are exaggerated for clarity. It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 1:
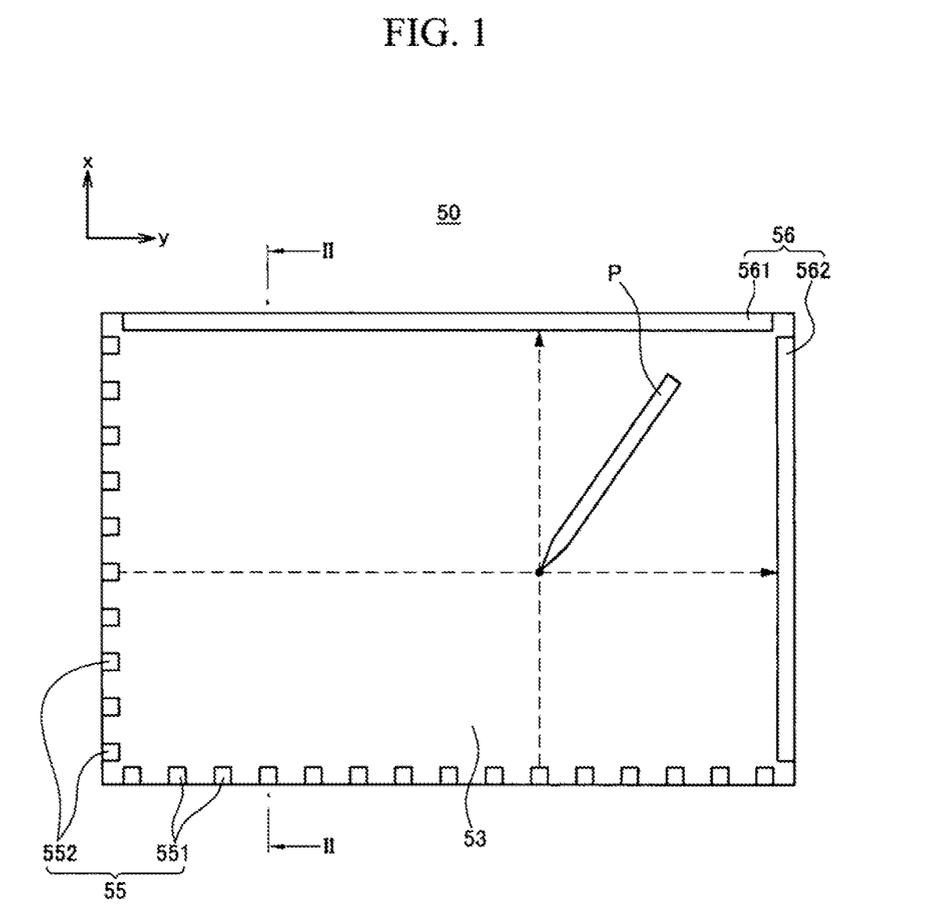
FIG. 1 is a view illustrating the layout of a touch panel according to a first embodiment of the invention.
Figure 2:
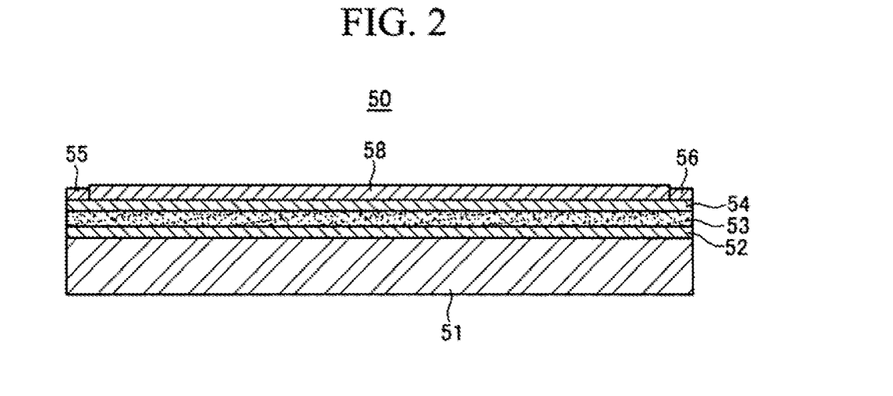
FIG. 2 is a cross-sectional view taken along the line II-II of FIG. 1.

Referring to FIGS. 1 and 2, a first embodiment of the invention will be described. FIG. 1 is a view illustrating the layout of a touch panel 50, and FIG. 2 is a cross-sectional view taken along the line II-II of FIG. 1.

As shown in FIGS. 1 and 2, the touch panel 50 includes a base substrate 51, a first transparent electrode layer 52, an ultrasonic wave guiding layer 53, a second transparent electrode layer 54, an ultrasonic wave transmitting unit 55, an ultrasonic wave receiving unit 56, and a protecting layer 58.

The base substrate 51 may be made of a material containing ceramic material, such as glass or quartz, or a plastic material. Also, the base substrate 51 may be formed to have rigidity or flexibility according to the kind of material thereof.

The ultrasonic wave guiding layer 53 is located on the first transparent electrode layer 52, and the second transparent electrode layer 54 is located on the ultrasonic wave guiding layer 53. The ultrasonic wave guiding layer 53 is made of a material including at least one of ZnO, Al-doped ZnO (AZO), and polyvinylidenefluoride (PVDF). The ultrasonic wave guiding layer 53 transmits an ultrasonic wave from the ultrasonic wave transmitting unit 55 to the ultrasonic wave receiving unit 56 such that a pressed position can be accurately detected.

The first transparent electrode layer 52 is located on the base substrate 51, and the second transparent electrode layer 54 is formed to face the first transparent electrode layer 52 with the ultrasonic wave guiding layer 53 interposed therebetween. The first transparent electrode layer 52 and the second transparent electrode layer 54 are made of a transparent conductive material, such as ITO (indium tin oxide) or IZO (indium zinc oxide).

The material of the ultrasonic wave guiding layer 53 has low adhesion to the insulating material used for forming the base substrate 51 or the protecting layer 58, particularly, a silicon oxide based material. The first transparent electrode layer 52 and the second transparent electrode layer 54 are located on and underneath the ultrasonic wave guiding layer 53, respectively, and stably adhere to the ultrasonic wave guiding layer 53 while maintaining the ultrasonic wave guiding performance of the ultrasonic wave guiding layer 53.

The ultrasonic wave transmitting unit 55 and the ultrasonic wave receiving unit 56 are located on the second transparent electrode layer 54. A pressed position in the touch panel 50 is detected on the basis of the difference between the ultrasonic wave transmitted by the ultrasonic wave transmitting unit 55 and the ultrasonic wave received by the ultrasonic wave receiving unit 56. The ultrasonic wave transmitted by the ultrasonic wave transmitting unit 55 moves along the ultrasonic wave guiding layer 53. The strength of the ultrasonic wave is reduced by the touch of a pen or finger. Therefore, the ultrasonic wave receiving unit 56 receives an ultrasonic wave having reduced strength, and thus an output voltage of an electrical signal corresponding to the received ultrasonic wave is also reduced. The pressed position is detected on the basis of such an output voltage difference.

The ultrasonic wave transmitting unit 55 includes X-axis transmitting units 551 located along an edge of the base substrate 51, and Y-axis transmitting units 552 located along another edge adjacent to the edge along which the X-axis transmitting units 551 are formed.

The ultrasonic wave receiving unit 56 includes an X-axis receiving unit 561 formed along another edge opposite to the X-axis transmitting units 551, and a Y-axis receiving unit 562 formed along another edge opposite to the Y-axis transmitting units 552.

The protecting layer 58 is located on the second transparent electrode layer 54 and protects the plurality of layers 52, 53, and 54 underneath the protecting layer 58. The protecting layer 58 is made of a transparent polymer based material.

The touch panel 50 having the above-mentioned structure can detect a position pressed by a pen P or a finger, as shown in FIG. 1. Since the touch panel 50 according to the embodiment of the invention has a structure in which various kinds of layers are successively laminated, it can be manufactured by only a thin film forming process. Therefore, a plurality of touch panels 50 can be completed by preparing a relatively-large-sized mother base substrate, laminating various kinds of layers on the mother base substrate, and cutting the mother base substrate. As a result, it is easy to integrate the manufacturing process of the touch panel 50 into the manufacturing process of a display device to use the touch panel 50, and thus the productivity is improved.

Hereinafter, a second embodiment of the present invention will be described with reference to FIG. 3.

Figure 3:
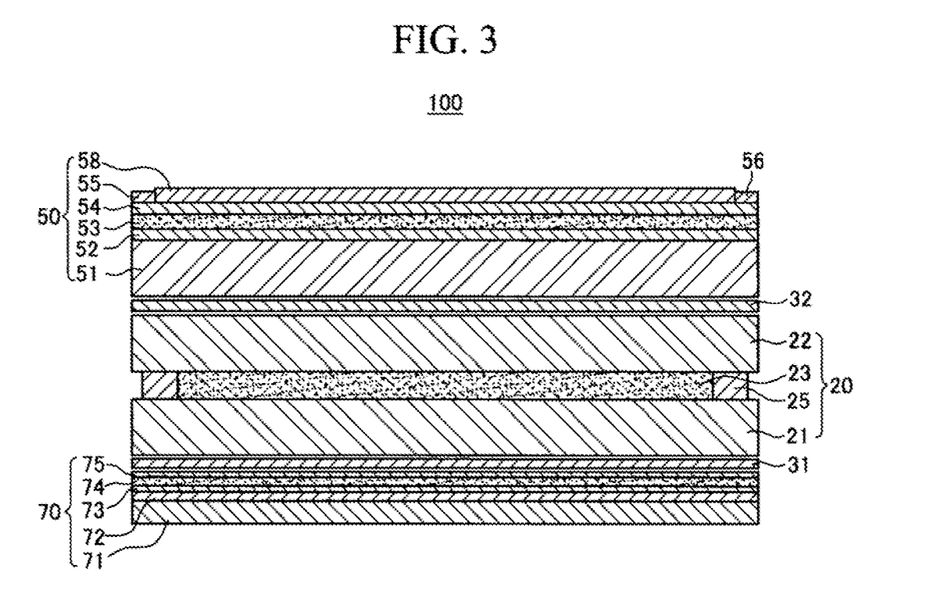
FIG. 3 is a cross-sectional view illustrating a display device according to a second embodiment of the invention.

FIG. 3 illustrates a cross section of a display panel 100 including the touch panel 50 shown in FIG. 1. The liquid crystal display panel is shown in FIG. 1 as a display panel 20 used in the display device 100. However, the liquid crystal display panel is merely to illustrate the present invention, and the present invention is not limited thereto. Other kinds of light receiving display panels may be used in the display device 100. The touch panel 50 according to the first embodiment of the present invention can also be applied to a display device using a self luminous display panel.

As shown in FIG. 3, the display device 100 includes a display panel 20 that has a plurality of pixels and displays image, the touch panel 50 located above the front surface of the display panel 20, and a backlight assembly 70 located above the rear surface of the display panel 20. The display device 100 further includes a first polarizer 31 located between the display panel 20 and the backlight assembly 70, and a second polarizer 32 located between the display panel 20 and the touch panel 50.

The display panel 20 includes a liquid crystal layer 23, a first display panel 21 located on the rear surface of the liquid crystal layer 23, and a second display panel 22 located on the front surface of the liquid crystal layer 23. The first display panel 21 and the second display panel 22 are bonded to each other by a sealant 25. The first polarizer 31 is attached to the rear surface of the first display panel 21, and the second polarizer 32 is attached to the front surface of the first display panel 22.

The touch panel 50 includes a base substrate 51, a first transparent electrode layer 52 located on the base substrate 51, an ultrasonic wave guiding layer 53 located on the first transparent electrode layer 52, a second transparent electrode layer 54 located on the ultrasonic wave guiding layer 53, and an ultrasonic wave transmitting unit 55, an ultrasonic wave receiving unit 56, and a protecting layer 58 located on the second transparent electrode layer 54. The base substrate 51 is attached to the second polarizer 32.

The backlight assembly 70 includes a light source substrate 71, a driving circuit unit 72 located on the light source substrate 71, an anode 73 connected to the driving circuit unit 72, an organic layer 74 located on the anode 73, and a cathode 75 located on the organic layer 74. The backlight assembly 70 may further include a shielding layer (not shown) that is located on the light source substrate 71 and protects the organic layer 74.

As described above, the organic layer 74 is located between the anode 73, serving as a hole injection electrode, and the cathode 75 serving as an electron injection electrode. Holes and electrons are injected from the electrodes 73 and 75 into the organic layer 74 and form excitons. When the excitons change from the excited state to a base state, light is emitted.

The organic layer 74 may be formed of a low-molecular organic material or a high-molecular organic material. The organic layer 74 may be formed in a single-layer structured light-emitting layer, or in a multi-layer structure including a light emitting layer and at least one of a hole injection layer (HIL), a hole transporting layer (HTL), a hole blocking layer, an electron transporting layer (ETL), an electron injection layer (EIL), and an electron blocking layer (EBL) formed around the light emitting layer.

The driving circuit unit 72 includes thin film transistors, and controls the light emission of the organic layer 74. That is, the driving circuit unit 72 controls the organic layer 74 to emit light over all so as to provide planar light to the display panel 20.

However, the present invention is not limited thereto. Therefore, the organic layer 74 may be divided into a plurality of regions corresponding to the pixels of the display panel 20 and the driving circuit unit 72 may control the plurality of divided regions of the organic layer 74 to individually emit light. In this case, the divided regions of the organic layer 74 may emit three primary color light components. When the organic layer 74 emits three primary color light components corresponding to the individual pixels, color filters formed in the display panel 20 may be omitted.

In the display device 100 according to the embodiment of the present invention, the base substrate 51, the first display panel 21, the second display panel 22, and the light source substrate 71 may be formed of a plastic material or a metallic material according to necessity to have flexibility. Each of the touch panel 50, the display panel 20, and the backlight assembly 70 has a structure in which various kinds of films are successively laminated and most of the films have flexibility. When each of the substrates 51, 21, 22, and 71 is formed of a flexible material, the display device 100 is formed to have flexibility as a whole.

However, the invention is not limited thereto. Each of the base substrate 51, the first display panel 21, the second display panel 22, and the light source substrate 71 may be made of a ceramic material, such as glass or quartz, to have rigidity. When each of the substrates 51, 21, 22, and 71 is made of a rigid material, the stability, durability and productivity of the display device 100 is improved.

As described above, since each of the components of the display device 100, that is, the touch panel 50, the display panel 20, and the backlight assembly 70 has a structure in which various kinds of films are successively laminated, the display device 100 can be manufactured by only a thin film forming process. Therefore, the manufacturing processes of the touch panel 50 and the backlight assembly 70 can be integrated into the manufacturing process of the display panel 20 using the touch panel 50 and the backlight assembly 70.

Furthermore, a plurality of touch panels 50 or a plurality of backlight assemblies 70 may be manufactured by preparing a relatively-large-sized mother base substrate, laminating various kinds of films on the mother base substrate to form a mother touch panel or a mother backlight assembly, and cutting the mother touch panel or the mother backlight assembly.

Therefore, a plurality of display panels 20 each having a touch panel 50 and a backlight assembly 70 attached thereto may be completed by attaching the mother touch panel and the mother backlight assembly to a mother display panel or directly forming the mother touch panel and the mother backlight assembly on the mother display panel, and cutting the mother display panel together with the mother touch panel and the mother backlight assembly.

With the above-mentioned structure, the whole structure of the display device 100 can be simplified and the thickness of the backlight assembly 70 can be remarkably reduced, which is advantageous to reduce the thickness of the display device 100. In addition, the integration and simplification of the manufacturing processes are possible and thus the productivity can be improved.

Hereinafter, a third embodiment of the present invention will be described with reference to FIG. 4.

Figure 4:
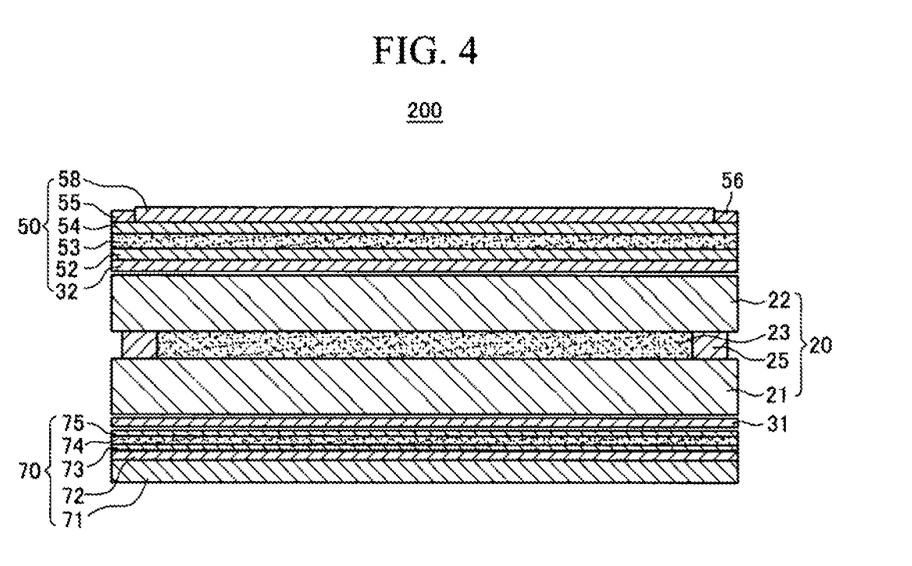
FIG. 4 is a cross-sectional view illustrating a display device according to a third embodiment of the invention.

As shown in FIG. 4, a display device 200 includes a display panel 20 that has a plurality of pixels and displays image, a touch panel 50 located on the front surface of the display panel 20, and a backlight assembly 70 located on the rear surface of the display panel 20. The display panel 20 includes a liquid crystal layer 23, a first display panel 21 located on the rear surface of the liquid crystal layer 23, and a second display panel 22 located on the front surface of the liquid crystal layer 23. The first display panel 21 and the second display panel 22 are bonded to each other by a sealant 25. The touch panel 50 is located on the front surface of the second display panel 22, and the backlight assembly 70 is located on the rear surface of the first display panel 21.

The touch panel 50 includes a base substrate 32, a first transparent electrode layer 52 located on the base substrate 51, an ultrasonic wave guiding layer 53 located on the first transparent electrode layer 52, a second transparent electrode layer 54 located on the ultrasonic wave guiding layer 53, and an ultrasonic wave transmitting unit 55, an ultrasonic wave receiving unit 56, and a protecting layer 58 located on the second transparent electrode layer 54.

A polarizer is used as the base substrate 32, and the display device 200 further includes an additional polarizer 31 located between the first display panel 21 and the backlight assembly 70. Since the base substrate 32 of the touch panel 50 is a polarizer, it is unnecessary to provide a separate polarizer between the touch panel 50 and the display panel 20.

In other words, it is possible that the touch panel 50 is formed by using a polarizer as the base substrate 32 and is then attached to the second display panel 22 of the display panel 20, and it is possible that the base substrate 32 is formed by attaching a polarizer to the second display panel 22 of the display panel 20 and then a touch panel 50 is located on the base substrate 32. Therefore, the structure and manufacturing process of the display device 200 can be further simplified.

Hereinafter, the display panel 20 and a structure for driving the display panel 20 will be described in detail with reference to FIGS. 5 and 6. Here, the display panel 20 is a liquid crystal panel.

Figure 5:
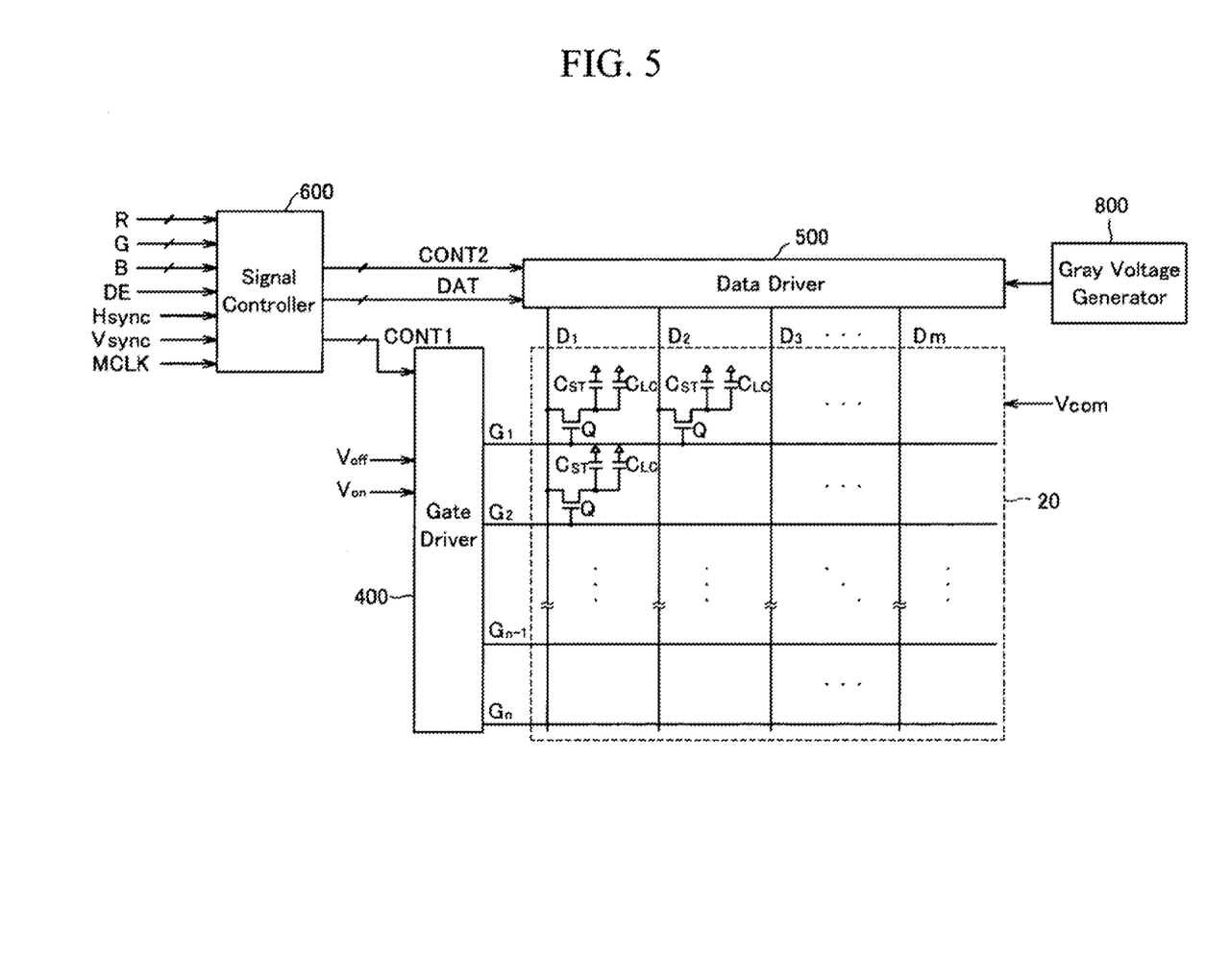
FIG. 5 is a block diagram illustrating the display device shown in FIG. 3 and a structure for driving the display device.
Figure 6:
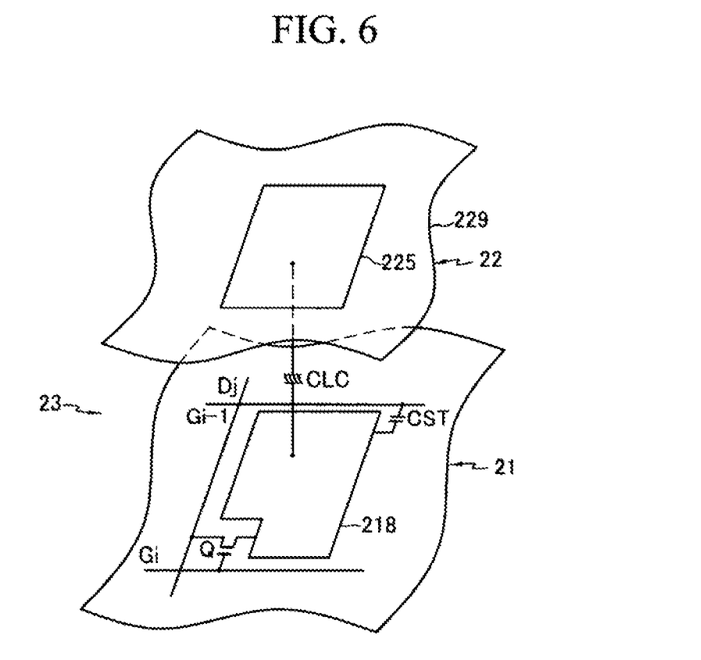
FIG. 6 is an equivalent circuit diagram of one pixel of the display panel shown in FIG. 5.

As shown in FIGS. 5 and 6, the first display panel 21 includes a plurality of signal lines $G_1$-$G_n$ and $D_1$-$D_m$, and the first display panel 21 and the second display panel 22 include a plurality of pixels which are connected to the signal lines $G_1$-$G_n$ and $D_1$-$D_m$ and are arranged substantially in a matrix.

The signal lines $G_1$-$G_n$ and $D_1$-$D_m$ are composed of a plurality of gate lines $G_1$-$G_n$ through which gate signals (referred to as "scanning signals") are transmitted and a plurality of data lines $D_1$-$D_m$ through which data signals are transmitted. The gate lines $G_1$-$G_n$ extend in a row direction so as to be parallel to each other, and the data lines $D_1$-$D_m$ extend in a column direction so as to be parallel to each other.

Each pixel includes a switching element Q connected to one of the gate lines $G_1$-$G_n$ and one of the data lines $D_1$-$D_m$, and a liquid crystal capacitor $C_{LC}$ and a storage capacitor $C_{ST}$ connected to the switching element Q. The storage capacitor $C_{ST}$ may be omitted, if necessary.

An example of the switching element Q is a thin film transistor and the switching elements are formed in the first display panel 21. The thin film transistor is a three-terminal element. A control terminal and an input terminal of the thin film transistor are connected to one of the gate lines $G_1$ to $G_n$ and one of the data lines $D_1$ to $D_n$, respectively, and an output terminal thereof is connected to the liquid crystal capacitor $C_{LC}$ and the storage capacitor $C_{ST}$.

A signal controller 600 controls the operation of a gate driver 400 and a data driver 500. The gate driver 400 supplies gate signals, each composed of a combination of a gate-on voltage Von and a gate-off voltage Voff, to the gate lines $G_1$ to $G_n$. The data driver 500 applies a data voltage to the data lines $D_1$ to $D_n$. A gray voltage generator 800 generates two gray voltage groups related to the transmittance of the pixel, each gray voltage group having a plurality of gray voltages and provides the two pairs of gray voltage groups to the data driver 500. One of the gray voltage groups has a positive value with respect to a common voltage Vcom, and the other gray voltage group has a negative value with respect to the common voltage Vcom.

As shown in FIG. 6, the liquid crystal capacitor $C_{LC}$ has as two terminals a pixel electrode 218 of the first display panel 21 and a common electrode 229 of the second display panel 22, and also has the liquid crystal layer 23 between the two electrodes 218 and 219 as a dielectric. The pixel electrode 218 is connected to the switching element Q and the common electrode 229 is formed over the entire surface of the second display panel 22. The common voltage Vcom is applied to the common electrode 229. Unlike the case shown in FIG. 6, the common electrode 229 may be provided on the first display panel 21. At least one of the two electrodes 218 and 229 may be formed in a linear or bar shape. Color filters 225 for coloring light passing through are located on the second display panel 22. Alternatively to the embodiment shown in FIG. 6, the color filters 225 may also be located on the first display panel 21. As described in the second exemplary embodiment, when the backlight assembly provides three primary color light components corresponding to the individual pixels, the color filters 225 may be omitted.

The storage capacitor $C_{ST}$, serving as an auxiliary member of the liquid crystal capacitor $C_{LC}$, is composed of a separate signal line (not shown) provided on the first display panel 21, the pixel electrode 218, and an insulator interposed therebetween. A predetermined voltage, such as the common voltage Vcom, is applied to the signal line. Alternatively, the storage capacitor $C_{ST}$ may be a laminated structure of the pixel electrode 218, the insulator, and a previous gate line of the gate lines $G_1$ to $G_n$ located on the insulator.

A polarizer (not shown) for polarizing light is attached to the outer surface of at least one of the two display panels 21 and 22 of the display panel 50.

In the above-mentioned structure, when the thin film transistor, serving as the switching element, is turned on, an electric field is formed between the pixel electrode 218 and the common electrode 229. The electric field changes the alignment angle of liquid crystal between the first display panel 21 and the second display panel 22, and accordingly, the optical transmittance is changed. In this way, a desired image is obtained.

Meanwhile, when a self luminous display panel other than the liquid crystal panel is used as the display panel 20, the polarizers 31 and 32 attached to the display panel 20 may be omitted. Therefore, the base substrate 51 of the touch panel 50 and the second display panel 22 of the display panel 20 may be integrated into a whole integrally formed. In other words, the touch panel 50 may be formed by using the second display panel 22 of the display panel 20 as the base substrate and directly laminating various kinds of layers thereon. As a result, the display device can be further simplified, the thickness thereof can be further reduced, and the manufacturing process thereof can be simplified.

Figure 7:
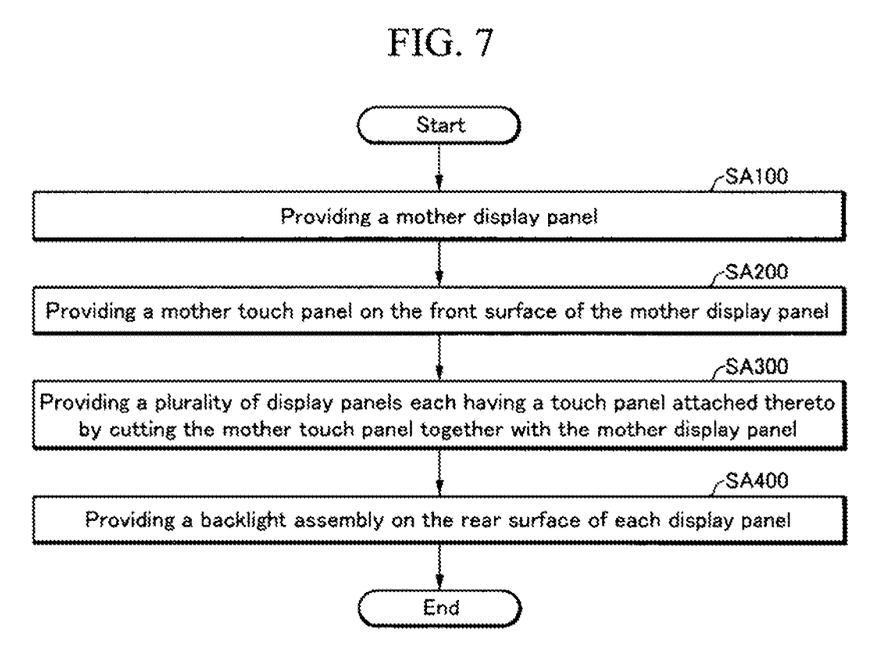
FIG. 7 is a flow chart representing a method for manufacturing a display device according to a fourth embodiment of the invention.

Hereinafter, a fourth embodiment of the present invention will be described with reference to FIG. 7. FIG. 7 is a flow chart representing a method of manufacturing the display device shown in FIGS. 3 and 4.

As shown in FIG. 7, a method of manufacturing the display device includes: providing a mother display panel SA100; providing a mother touch panel on the front surface of the mother display panel SA200; providing a plurality of display panels 20 (shown in FIG. 3) each having a touch panel 50 (shown in FIG. 3) attached thereto by cutting the mother touch panel together with the mother display panel SA300; and providing a backlight assembly 70 (shown in FIG. 3) on the rear surface of each display panel 20 SA400. Here, the mother display panel includes a first mother display panel located on the rear side thereof and a second mother display panel that is located on the front side thereof and is bonded to the first mother display panel. The method of manufacturing the display device further includes attaching a first polarizer to the rear surface of the first mother display panel and attaching a second polarizer to the front surface of the second mother display panel. Then, the mother touch panel is located on the front surface of the second polarizer.

The touch panel 50 includes a base substrate 51, a first transparent electrode layer 52 located on the base substrate 51, an ultrasonic wave guiding layer 53 located on the first transparent electrode layer 52, a second transparent electrode layer 54 located on the ultrasonic wave guiding layer 53, and an ultrasonic wave transmitting unit 55, an ultrasonic wave receiving unit 56, and a protecting layer 58 located on the second transparent electrode layer 54, as shown in FIG. 3. The base substrate 51 is attached to the second polarizer 32.

Alternatively, the touch panel 50 may include a first transparent electrode layer 52 located on the second polarizer 32, an ultrasonic wave guiding layer 53 located on the first transparent electrode layer 52, a second transparent electrode layer 54 located on the ultrasonic wave guiding layer 53, and an ultrasonic wave transmitting unit 55, an ultrasonic wave receiving unit 56, and a protecting layer 58 located on the second transparent electrode layer 54, as shown in FIG. 4.

When the mother touch panel, the second polarizer, and the second mother display panel are attached to one another, it is possible that the mother touch panel is first attached to or directly located on the second polarizer and then the second polarizer is attached to the front surface of the second mother display panel. Alternatively, it is possible that the second polarizer is first attached to the second mother display panel and then the mother touch panel is attached to or directly located on the second polarizer.

According to the above-mentioned manufacturing method, the manufacturing process of the touch panel 50 is integrated into the manufacturing process of the display panel 20 having the touch panel attached thereto. More specifically, the display panel 20 having the touch panel 50 attached thereto can be completed by attaching the mother touch panel to the mother display panel or directly forming the mother touch panel on the mother display panel and cutting the mother touch panel together with the mother display panel in a mother display panel cutting process. Then, the backlight assembly 70 is separately attached to the rear surface of the display panel 20. Therefore, the whole manufacturing process of the display panel can be simplified.

The mother display panel cutting process is performed by any one of a water jet method, a wheel scriber method, and a laser cutting method.

The water jet method is a method of cutting an object by jetting water at high pressure, the wheel scriber method is a method of cutting an object by pressing the object while rolling a wheel-shaped member thereon, and the laser cutting method is a method of cutting an object using a laser.

According to an embodiment of the present invention, since each of the touch panel 50 and display panel 20 has a structure in which various kinds of films are successively laminated, it is possible to cut the mother display panel and the mother touch panel at the same time by using a relatively simple physical cutting method. Therefore, the productivity of the display panel can be further improved.

Figure 8:
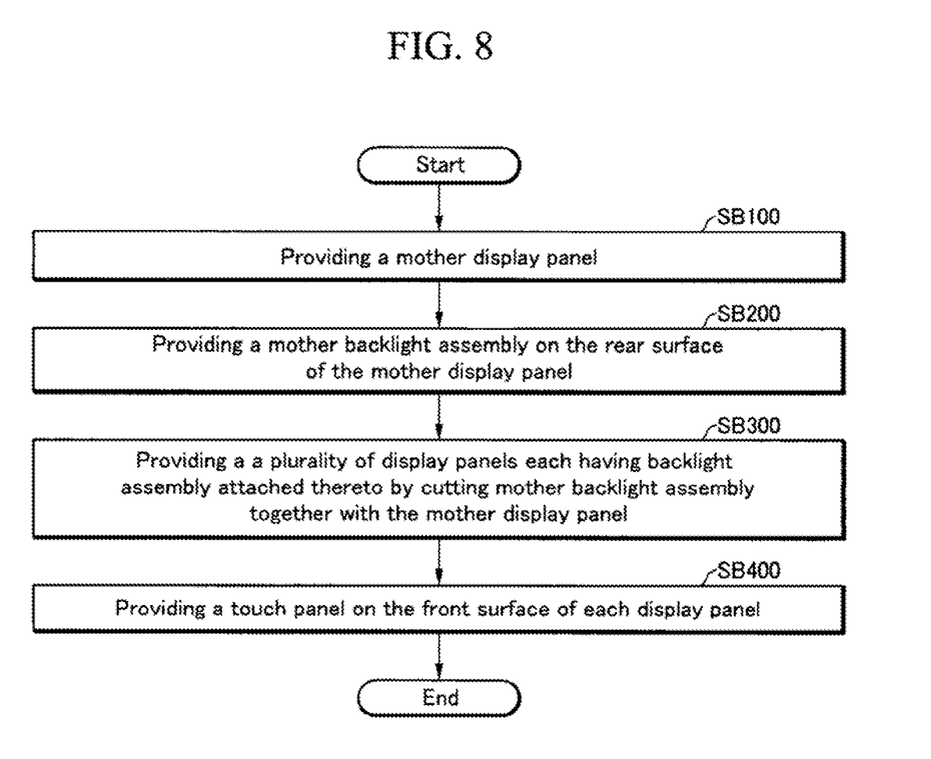
FIG. 8 is a flow chart representing a method for manufacturing a display device according to a fifth embodiment of the invention.

Hereinafter, a fifth embodiment of the present invention will be described with reference to FIG. 8. FIG. 8 is a flow chart representing another method of manufacturing the display device shown in FIGS. 3 and 4.

As shown in FIG. 8, another method of manufacturing the display device includes: providing a mother display panel SB100; providing a mother backlight assembly on the rear surface of the mother display panel SB200; providing a plurality of display panels 20 each having a backlight assembly 70 attached thereto by cutting the mother backlight assembly together with the mother display panel SB300; and providing a touch panel 50 on the front surface of each display panel 20 SB400. The mother display panel includes a first mother display panel located on the rear side thereof, and a second mother display panel that is located on the front side thereof and is bonded to the first mother display panel. The method according to this embodiment further includes attaching a first polarizer to the rear surface of the first mother display panel, and attaching a second polarizer to the front surface of the second mother display panel. Then, the mother backlight assembly is located on the first polarizer.

In this embodiment, the backlight assembly 70 includes a light source substrate 71, a driving circuit unit 72 located on the light source substrate 71, an anode 73 connected to the driving circuit unit 72, an organic layer 74 located on the anode 73, and a cathode 75 located on the organic layer 74, as shown in FIGS. 3 and 4. The backlight assembly 70 may further include a shielding layer (not shown) that is located on the light source substrate 71 and protects the organic layer 74.

When the mother backlight panel, the first polarizer, and the first mother display panel are attached to one another, it is possible that the mother backlight panel is first attached to or directly located on the first polarizer and then the first polarizer is attached to the rear surface of the first mother display panel. Alternatively, it is possible that the first polarizer is firstly attached to the first mother display panel and then the mother backlight panel is attached to or directly located on the rear surface of the first polarizer.

According to the above-mentioned manufacturing method, the manufacturing process of the backlight assembly 70 is integrated into the manufacturing process of the display panel 20 having the backlight assembly attached thereto. More specifically, the display panel 20 having the backlight assembly 70 attached thereto can be completed by attaching the mother backlight assembly to the mother display panel or directly providing the mother backlight assembly on the mother display panel and cutting the mother backlight assembly together with the mother display panel in a mother display panel cutting process. Then, the touch panel 50 is attached to the front surface of the display panel 20. Therefore, the whole manufacturing process of the display panel can be simplified.

According to the embodiment of the present invention, since each of the backlight assembly 70 and display panel 20 has a structure in which various kinds of films are successively laminated, it is possible to cut the mother display panel and the mother backlight assembly at the same time by using a physical cutting method. Therefore, the productivity of the display panel can be further improved.

Figure 9:
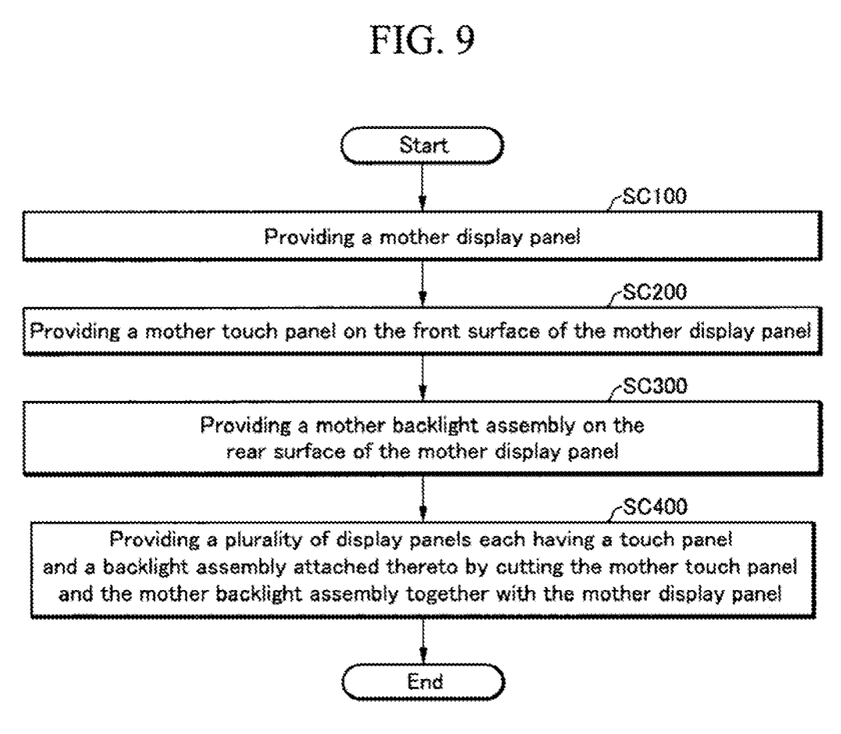
FIG. 9 is a flow chart representing a method for manufacturing a display device according to a sixth embodiment of the invention.

Hereinafter, a sixth embodiment of the present invention will be described with reference to FIG. 9. FIG. 9 is a flow chart representing another method of manufacturing the display panel shown in FIGS. 3 and 4.

As shown in FIG. 9, the method of manufacturing the display device according to the sixth embodiment includes: providing a mother display panel SC100; providing a mother touch panel on the front surface of the mother display panel SC200; providing a mother backlight assembly on the rear surface of the mother display panel SC300; and providing a plurality of display panels 20 each having a touch panel 50 and a backlight assembly 70 attached thereto by cutting the mother touch panel and the mother backlight assembly together with the mother display panel SC400. In this embodiment, the mother display panel includes a first mother display panel located on the rear side thereof, and a second mother display panel that is located on the front side thereof and is bonded to the first mother display panel. The method according to the sixth embodiment further includes attaching a first polarizer to the rear surface of the first mother display panel, and attaching a second polarizer to the front surface of the second mother display panel. Then, the mother touch panel is located on the front surface of the second polarizer and the mother backlight assembly is located on the rear surface of the first polarizer.

According to the above-mentioned manufacturing method, the manufacturing processes of the touch panel 50 and the backlight assembly 70 are integrated into the manufacturing process of the display panel 20 having the touch panel 50 and the backlight assembly attached thereto. More specifically, the display panel 20 having the touch panel 50 and the backlight assembly 70 attached thereto can be completed by attaching the mother touch panel and the mother backlight assembly to the mother display panel or directly providing the mother touch panel and the mother backlight assembly on the mother display panel, and cutting the mother touch panel and the mother backlight assembly together with the mother display panel in a mother display panel cutting process. Therefore, the whole manufacturing process of the display panel can be simplified.

According to the embodiment of the present invention, since each of the backlight assembly 70 and display panel 20 has a structure in which various kinds of films are successively laminated, it is possible to cut the mother display panel and the mother backlight assembly at the same time by using a physical cutting method. Therefore, the productivity of the display panel can be further improved.

As described above, according to the present invention, it is possible to improve the structure of the touch panel and thus to improve the productivity. Further, it is possible to provide a small-sized and thin display device having the touch panel, which has a simplified whole structure and improved productivity.

Furthermore, since each of components of the display device, that is, the touch panel, the display panel, and the backlight assembly has a structure in which various films are successively laminated, it is possible to manufacturing the display device by only a thin film forming process. Therefore, the manufacturing processes of the touch panel and the backlight assembly are integrated into the manufacturing process of a display panel having the touch panel and the backlight assembly attached thereto, and thus the whole manufacturing process of the display device can be simplified, resulting in improvement of the productivity.

In addition, the display panel having the touch panel and the backlight assembly attached thereto can be completed by attaching the mother touch panel and the mother backlight assembly to the mother display panel or directly providing the mother touch panel and the mother backlight assembly on the mother display panel, and cutting the mother touch panel and the mother backlight assembly together with the mother display panel in a mother display panel cutting process. Therefore, the whole structure of the display device can be simplified and the thickness of the backlight assembly can be remarkably reduced, which is favorable to reduce the thickness of the display device.

Furthermore, it is possible to further simplify the whole structure and manufacturing process of the display device by using the polarizer attached to the display panel as the base substrate of the touch panel.

Furthermore, since the display device can be manufactured by a relatively simple physical cutting method, it is possible to further improve the productivity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a display device, comprising:
   providing a mother display panel;
   providing a mother touch panel of a front surface of the mother display panel;
   providing a mother backlight assembly on a rear surface of the mother display panel; and
   providing a plurality of display panels each having a touch panel and a backlight assembly attached thereto by cutting the mother touch panel and the mother backlight assembly together with the mother display panel;
   wherein the mother display panel comprises a first mother display panel located on the rear side thereof and a second mother display panel that is located on the front side thereof and is bonded to the first mother display panel,
   a first polarizer is attached to the rear surface of the first mother display panel and a second polarizer is attached to the front surface of the second mother display panel, and
   the mother touch panel is located on the front surface of the second polarizer.

2. The method of claim 1, wherein the touch panel comprises:
   a base substrate attached to the second polarizer;
   a first transparent electrode layer located on the base substrate;
   the ultrasonic wave guiding layer located on the first transparent electrode layer;
   a second transparent electrode layer located on the ultrasonic wave guiding layer;
   an ultrasonic wave transmitting unit and an ultrasonic wave receiving unit located on the second transparent electrode layer; and
   a protecting layer located on the second transparent electrode layer.

3. The method of claim 1, wherein the touch panel comprises:
   a first transparent electrode layer located on the second polarizer;
   an ultrasonic wave guiding layer located on the first transparent electrode layer;
   a second transparent electrode layer located on the ultrasonic wave guiding layer;
   an ultrasonic wave transmitting unit and an ultrasonic wave receiving unit located on the second transparent electrode layer; and
   a protecting layer located on the second transparent electrode layer.

4. The method of claim 1, wherein the second polarizer having the mother touch panel attached thereto is attached to the rear surface of the second mother display panel.

5. The method of claim 1, wherein the mother touch panel is attached to the second polarizer attached to the rear surface of the second mother display panel.

6. The method of claim 1,
   wherein the mother backlight assembly is disposed on the first polarizer.

7. The method of claim 6, wherein the first polarizer having the mother backlight assembly attached thereto is attached to the rear surface of the first mother display panel.

8. The method of claim 6 wherein the mother backlight assembly is attached to the first polarizer attached to the rear surface of the first mother display panel.

9. The method of claim 6, wherein the backlight assembly comprises:
   a light source substrate;
   a driving circuit unit located on the light source substrate;
   an anode connected to the driving circuit unit;
   an organic layer located on the anode; and
   a cathode located on the organic layer.

10. The method of claim 1, wherein the mother display panel is cut by any one of a water jet method, a wheel scriber method, and a laser cutting method.

11. A method of manufacturing a display device, comprising:
    providing a mother display panel;
    providing a mother backlight assembly on a rear surface of the mother display panel;
    providing a plurality of display panels each having a backlight assembly attached thereto by cutting the mother backlight assembly together with the mother display panel; and
    providing a touch panel on a front surface of at least one of the display panels;
    wherein the mother display panel comprises a first mother display panel located on the rear side thereof and a second mother display panel that is located on the front side thereof and is bonded to the first mother display panel,
    a first polarizer is attached to the rear surface of the first mother display panel and a second polarizer is attached to the front surface of the second mother display panel, and
    the mother backlight assembly is located on the rear surface of the first polarizer.

12. The method of claim 11, wherein the backlight assembly comprises:
    a light source substrate;
    a driving circuit unit located on the light source substrate;
    an anode connected to the driving circuit unit;
    an organic layer located on the anode; and
    a cathode located on the organic layer.

13. The method of claim 11, wherein the first polarizer having the mother backlight assembly attached thereto is attached to the rear surface of the first mother display panel.

14. The method of claim 11, wherein the mother backlight assembly is attached to the first polarizer attached to the rear surface of the first mother display panel.

15. The method of claim 11, wherein the touch panel comprises:
- a base substrate attached to the second polarizer;
- a first transparent electrode layer located on the base substrate;
- an ultrasonic wave guiding layer located on the first transparent electrode layer;
- a second transparent electrode layer located on the ultrasonic wave guiding layer;
- an ultrasonic wave transmitting unit and an ultrasonic wave receiving unit located on the second transparent electrode layer; and
- a protecting layer located on the second transparent electrode layer.

16. The method of claim 11, wherein the touch panel comprises:
- a first transparent electrode layer located on the second polarizer;
- an ultrasonic wave guiding layer located on the first transparent electrode layer;
- a second transparent electrode layer located on the ultrasonic wave guiding layer;
- an ultrasonic wave transmitting unit and an ultrasonic wave receiving unit located on the second transparent electrode layer; and
- a protecting layer located on the second transparent electrode layer.

17. The method of claim 11, wherein the mother display panel is cut by any one of a water jet method, a wheel scriber method, and a laser cutting method.

* * * * *